F. SCHUBERT.

PRESSURE GAGE.

APPLICATION FILED NOV. 9, 1916.

Reissued July 31, 1917.

14,339.

Inventor

Frederick Schubert

By his Attorneys

Mitchell & Allen.

UNITED STATES PATENT OFFICE.

FREDERICK SCHUBERT, OF SELLERSVILLE, PENNSYLVANIA, ASSIGNOR TO UNITED STATES GAUGE COMPANY, OF SELLERSVILLE, PENNSYLVANIA, A CORPORATION OF PENNSYLVANIA.

PRESSURE-GAGE.

14,339. Specification of Reissued Letters Patent. Reissued July 31, 1917.

Original No. 1,192,574, dated July 25, 1916, Serial No. 26,679, filed May 8, 1915. Application for reissue filed November 9, 1916. Serial No. 130,487.

*To all whom it may concern:*

Be it known that I, FREDERICK SCHUBERT, a citizen of the United States, residing at Sellersville, Bucks county, Pennsylvania, have invented certain new and useful Improvements in Pressure-Gages, of which the following is a specification.

The invention relates to pressure gages and particularly to an improved form thereof whereby danger to an attendant reading the gage is eliminated in the event of explosion. Gages of the character to which my invention relates are commonly equipped with face glasses over the dial. Heretofore, in gages as ordinarily constructed, in the event of the bursting of the pressure sensitive element, the dial or gage glass, or both, becomes fractured by the release of pressure so that an attendant reading the gage at such a time is liable to be seriously injured. Such gages are used in connection with oxygen apparatus and in many instances serious explosions have occurred in such use due to carelessness in permitting oil to get into the apparatus. Various attempts have been made to obviate this danger by the use of safety releases, and such devices have only been indifferently successful in practice. In the use of a gage in the above connection, when explosions occur there is an instantaneous release of very high pressures and so far as I am aware such devices as have heretofore been employed for safety have been inadequate owing to the fact that such safety devices have been associated with the ordinary gages as constructed prior to my invention. Such gages have been constructed in the form of a cup-shaped receptacle with its open side disposed to the front, and the pressure sensitive element, dial and face glass have been all inserted and applied thereto through the front. Since the solid wall of the receptacle was disposed at the rear of the pressure sensitive element, when explosion occurred the force thereof expended itself in the direction of, and would blow out, the dial or glass since that course offered the least resistance.

My invention contemplates a fundamentally different construction in which a heavy pressure resisting wall is provided and located between the pressure sensitive element and the indicating means. My casing or covering is also made to provide an opening of sufficient size, to the rear of the pressure resisting wall, to permit of the successful venting of the casing and the certain escape of high pressure gases without danger to the indicating means or face glass in the event of explosion. Thus, it is impossible for the face glass or dial to be blown out or broken in the event of the bursting of said pressure sensitive element, and hence the safety of anyone reading the gage at such a time is guaranteed. While the casing or covering is provided with said opening or vent to the rear of the pressure resisting wall, it is advisable to cover said opening with a lightly retained or movable closure, such as a plate, to thereby exclude dust and dirt. In order that the purpose of the invention may not be defeated, it is, of course, important that said closure plate be so lightly retained that its resistance relatively to the resistance of the said pressure resisting wall be so slight that the moment rupture or bursting of the pressure sensitive element occurs, the force of said explosion will expend itself freely through said opening, the closure, when present, yielding outwardly for that purpose.

In the accompanying drawings, I have shown my invention in its preferred form, but it should be understood that I am aware that various modifications may be made in the design and arrangement of parts.

Figure 1:
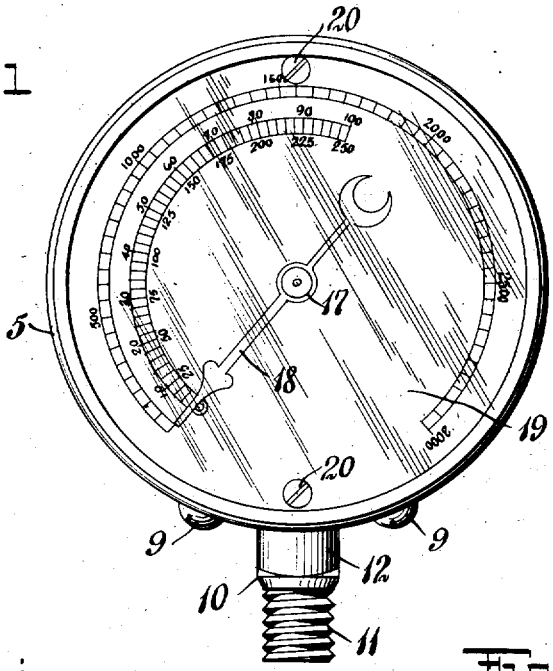
Figure 1 is a front elevation of a pressure gage embodying the main features of my present invention.
Figure 2:
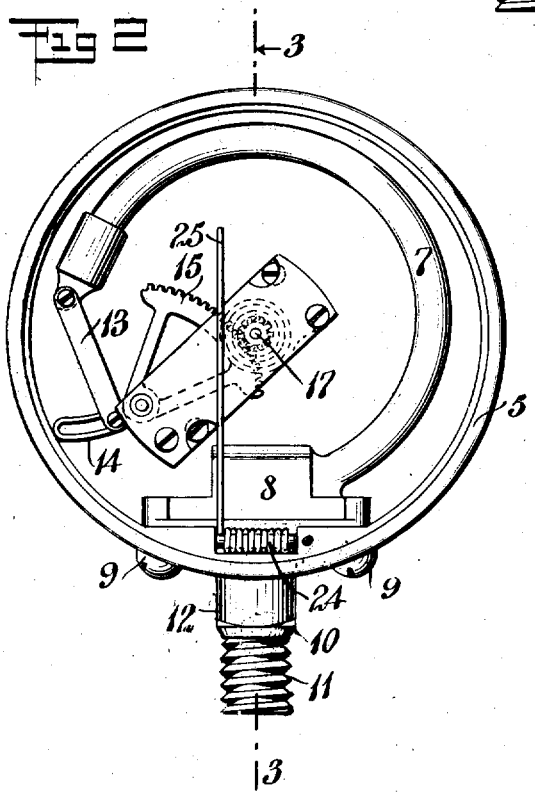
Fig. 2 is a rear elevation thereof showing the vent opening, the closure therefor being removed.
Figure 3:
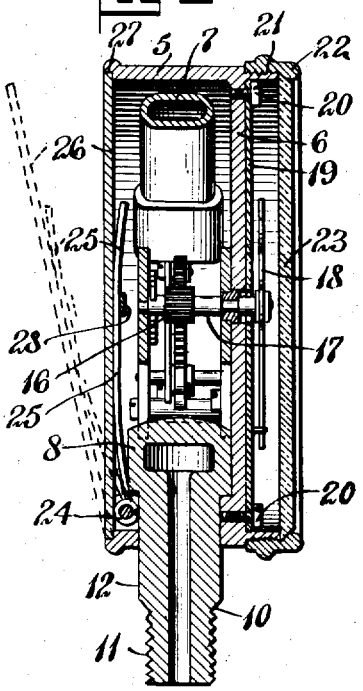
Fig. 3 is a vertical section taken on approximately the line 3—3 of Fig. 2 and showing the closure in place in solid lines, and displaced in dotted lines.

In that particular form of my invention shown in the accompanying drawings, 5 represents what I may term the casing, guard or covering, which in this instance, is of cup-shaped formation. 6 is a strong and substantial wall disposed at the front thereof and preferably formed integrally therewith. This wall constitutes what I may term the pressure resisting wall. Behind the pressure resisting wall 6 is the pressure sensitive element which in this case is in the form of a Bourdon tube 7. This tube 7 is carried by a base block 8 suitably secured to the casing 5, and thereby to the wall 6, by means of screws 9—9. 10 is a downwardly projecting nipple threaded at 11, which nipple may have a non-circular portion 12 which extends through a correspondingly shaped aperture in the casing to assist in locking the casing plate and nipple against independent movement. This portion 12 also serves as a means for engagement by a wrench to assist in screwing the gage onto the end of a pipe. The free end of the Bourdon tube 7 is suitably connected by link 13 to a lever arm 14 of a pivoted sector gear 15, which latter engages with a pinion 16 mounted on pivot 17 which is suitably journaled in the casing and which passes through a small perforation in the pressure resisting plate 6, whereby an indicating pointer or needle 18 may be secured to the outer end of said shaft. At the front side of the pressure resisting plate are pressure indicating graduations which may be engraved directly on the front face of said wall 6, or on the usual thin dial plate 19 which latter may be secured in place by screws 20, or otherwise. Covering the dial and indicating needle is the usual face glass 23 which serves to protect the needle and dial from dirt and atmospheric contaminations or other injury. This face glass may be held in place by a threaded ring 22 arranged to screw on to a threaded flange 21. 24 is a coil spring having an extending arm 25 which serves as a means for lightly retaining in place a movable closure plate which covers the vent opening at the back of the casing thereby preventing the entrance of dirt into the mechanism of the gage. The casing or covering may have a recess 27 around its vent opening in which said closure plate may be lightly held by the tension of spring 24. In this particular construction the arm 25 of the spring engages a clip 28 on the inner face of the closure plate.

In operation, variation in pressure within the pressure sensitive element produces movement thereof which is transmitted to the indicating pointer 18 which is caused to travel over the dial graduations to indicate thereon the existing pressure. It will be seen that in the event the pressure sensitive element bursts, the force of the escaping fluid will be resisted by the heavy pressure resisting wall and will escape and expend itself entirely to the rear thereof through the opening in the guard or casing, hence, anyone reading the gage at such a time is safeguarded fron injury. By my improvement, an explosion results in a minimum of damage, since the covering itself is provided with an adequate opening to the rear of the pressure resisting wall to permit the free escape of high pressure gases that would otherwise be obliged to break their way out and thereby result not only in injury to the pressure sensitive element, but also to the covering therefor. By the provision of a special pressure resisting wall between the pressure sensitive element and the face glass and by providing a covering for the pressure sensitive element and its associated parts so designed as to afford a free escape for high pressure gases such as would result in the event of an explosion, I have not only absolutely safeguarded from injury anyone reading the gage at the moment of said explosion, but have also furnished such a free egress for the gases that the same do not have to burst their way out of the covering to the injury thereof. Obviously the casing may be constructed in a great variety of ways, the purpose thereof being merely to furnish a shelter, guard or protection for the pressure sensitive element and the mechanism associated therewith. So also the design of the closure, when employed, and the means by which it may be lightly held in place, may be modified in a great variety of ways. The same is also true of the construction and design of the pressure sensitive element and the means by which the same is connected to the indicating mechanism. All of these features I contemplate may be modified in a wide variety of ways without departing from the essential and material features of novelty and utility which characterize my invention and discovery.

What I claim is:

1. In a single faced pressure gage, a cup shaped casing having its open side disposed to the rear and its strong substantial wall disposed to the front, indicating means disposed in front of said wall, a face glass mounted in front of said indicating means, and a pressure sensitive element mounted in the interior of said casing behind the said wall for controlling said indicating means, said wall being adapted to resist the force of rupture of the pressure sensitive element and to thereby prevent breakage of said glass.

2. In a single faced pressure gage, a cup shaped casing having its open side disposed to the rear and its strong substantial wall disposed to the front, indicating means disposed in front of said wall, a face glass mounted in front of said indicating means, and a pressure sensitive element mounted in the interior of said casing behind the said wall for controlling said indicating means, said wall being adapted to resist the force of rupture of the pressure sensitive element and to thereby prevent breakage of said face glass, and a plate for closing the rear side of said casing lightly retained therein whereby the force of such rupture may be permitted to expend to the rear of the casing.

3. In a pressure gage, a casing, a pressure sensitive element mounted therein, a face glass mounted in the front of the casing, a strong substantial wall interposed between said pressure sensitive element and said face glass adapted to resist the force of a rupture of the pressure sensitive element and thereby prevent breakage of the face glass, and a plate for closing the rear of the casing lightly retained therein whereby the force of such rupture may be permitted to expend to the rear of the casing.

4. In a pressure gage, a cup shaped casing having a strong substantial wall disposed toward the front of the casing, indicating means disposed in front of said wall, a face glass mounted in front of said indicating means, a pressure sensitive element mounted in the interior of said casing behind said wall for controlling said indicating means, a plate for closing the rear of said casing, and spring means for lightly retaining said plate in position under normal conditions.

5. In a pressure gage, a cup shaped casing having a strong substantial wall disposed toward the front of the casing, indicating means disposed in front of said wall, a face glass mounted in front of said indicating means, a pressure sensitive element mounted in the interior of said casing behind said wall for controlling said indicating means, a plate for closing rear of said casing, and means for lightly retaining said plate in position under normal conditions comprising an internally arranged spring having an extending arm engaging said plate.

6. In a pressure gage, an integral cup shaped casing having its open side disposed to the rear, a plate for closing said rear open side, and means for lightly retaining said plate in position under normal conditions.

7. In a pressure gage, a cup shaped casing having its open side disposed to the rear, a plate for closing said rear open side, and means for lightly retaining said plate in position under normal conditions comprising an internally arranged coil spring having an extending arm engaging said plate.

8. In a pressure gage, a cup shaped casing having its open side disposed to the rear, a plate for closing said rear open side, and means for lightly retaining said plate in position under normal conditions comprising an internally arranged coil spring having an extending arm engaging said plate at or near the center thereof.

9. In a pressure gage, a pressure sensitive element, a pressure indicating means, a strong substantial pressure resisting wall located between said element and said means, a casing for said parts including a transparent covering for said indicating means, there being an opening in that part of the casing in which said pressure sensitive element is located, said opening being to the rear of said wall and of adequate size to freely release the pressure within the casing without injury to said wall in the event of the bursting of the pressure sensitive element, to thereby safeguard said transparent covering.

10. In a pressure gage, a pressure sensitive element, a pressure indicating means, a strong substantial pressure resisting wall located between said element and said means, a casing for said parts including a transparent covering for said indicating means, there being an opening in that part of the casing in which said pressure sensitive element is located, said opening being to the rear of said wall and of adequate size to freely release the pressure within the casing without injury to the wall in the event of the bursting of the pressure sensitive element, to thereby prevent breakage of said transparent covering and of said casing, and a lightly retained closure for said opening.

11. In a pressure gage, a pressure sensitive element, a pressure indicating means, a strong substantial pressure resisting wall located between said element and said means, a casing for said parts including a transparent covering for said indicating means, there being an opening in that part of the casing in which said pressure sensitive element is located, said opening being to the rear of said wall and affording a vent to relieve pressure within the casing in the event of the bursting of the pressure sensitive element, to thereby prevent breakage of said transparent covering and of said casing, a closure for said opening and a spring for lightly retaining said closure.

12. In a pressure gage, a pressure sensitive element, pressure indicating means, a strong substantial pressure resisting wall located between said element and said indicating means and protecting the latter in the event of explosion of said pressure sensitive element, a guard covering for said pressure sensitive element also located at the rear of said pressure resisting wall and constructed to provide a vent opening also to the rear of said wall and of adequate size to permit the free escape of high pressure gases in the event of explosion of said pressure sensitive element.

13. In a pressure gage, a pressure sensitive element, pressure indicating means, a strong substantial pressure resisting wall located between said element and said indicating means and protecting the latter in the event of explosion of said pressure sensitive element, a guard covering for said pressure sensitive element also located at the rear of said pressure resisting wall and constructed to provide a vent opening also to the rear of said wall and of adequate size to permit the free escape of high pressure gases in the event of explosion of said pressure sensitive element, and a movable closure for said opening carried by said gage.

14. In a pressure gage, a cup-shaped casing having a strong substantial inner wall integral with the sides, the outer end of said casing being open, a pressure sensitive element mounted within said casing, a pressure indicating means mounted on the outside of said inner wall with operative means of connection between said element and indicating means, and a closure plate for the open end of said casing and carried thereby, with means for lightly holding the same in place whereby in the event of bursting of the pressure sensitive element said closure plate will yield to permit the escape of high pressure gases wholly through said rear opening.

15. A pressure sensitive element, a pressure indicating means, a strong substantial pressure resisting wall located between said element and said means to protect the latter in the event of the bursting of the former, a transparent covering for said indicating means forward of said wall and indicating means, a guard covering for said pressure sensitive element to the rear of said wall, said guard covering being constructed to provide a vent opening to the rear of said pressure resisting wall of adequate size to permit free escape of the high pressure gases released by an explosion of the pressure sensitive element without injury to the wall, and a lightly retained movable closure means for said vent opening, whereby in the event of bursting of said pressure sensitive element the high pressure gases may freely escape through said vent opening without breaking the transparent covering over the indicating means.

16. A pressure gage comprising a strong substantial pressure resisting wall, a pressure sensitive element disposed in rear of said wall, pressure indicating means disposed in front of said wall and operably connected with the pressure sensitive element at the rear of the pressure resisting wall, casing means for the pressure sensitive element and indicating means, including a transparent cover over the indicating means, said casing means having an opening therein at the rear of the pressure resisting wall and of adequate size to provide for the escape of high pressure gases released by the bursting of the pressure sensitive element without injury to said wall or to said casing, and lightly retained closure means for said venting opening.

FREDERICK SCHUBERT.